United States Patent [19]

Gabriel et al.

[11] Patent Number: 4,813,911
[45] Date of Patent: Mar. 21, 1989

[54] SELF-NORMALIZING COMPLIANT DRIVE COUPLING

[75] Inventors: Mark F. Gabriel, Renton; Walter D. Sykes, Federal Way; Jeffrey C. Bye, Seattle, all of Wash.

[73] Assignee: The Boeing Company, Seattle, Wash.

[21] Appl. No.: 74,134

[22] Filed: Jul. 16, 1987

[51] Int. Cl.⁴ .............................................. F16D 3/16
[52] U.S. Cl. ..................................... 464/173; 279/16; 408/127
[58] Field of Search .......................... 81/177.7, 177.75; 279/16; 408/127; 464/88, 173, 904

[56] References Cited

U.S. PATENT DOCUMENTS

| | | | |
|---|---|---|---|
| 2,051,085 | 8/1936 | Ilseman | 464/173 X |
| 2,271,568 | 3/1942 | Olson | 464/88 |
| 2,360,962 | 10/1944 | Megathlin | 408/89 |
| 2,534,635 | 12/1950 | Stillwagon, Jr. | 464/173 |
| 2,574,016 | 11/1951 | Burg | 408/127 |
| 2,648,208 | 8/1953 | Stillwagon, Jr. | 464/173 |
| 2,664,002 | 12/1953 | Anderson | 464/112 |
| 2,722,812 | 11/1955 | Golasky | 464/173 X |
| 2,761,298 | 9/1956 | Jarvis | 464/88 |
| 3,945,751 | 3/1976 | Johnson | 408/127 |
| 4,014,622 | 3/1977 | Lotz | 408/127 |
| 4,065,941 | 1/1978 | Aoki | 81/177.75 X |
| 4,551,947 | 11/1985 | Grimm et al. | 408/127 X |

*Primary Examiner*—Daniel P. Stodola
*Attorney, Agent, or Firm*—Christensen, O'Connor, Johnson & Kindness

[57] ABSTRACT

A self-normalizing compliant drive coupling (10) having a constant-velocity joint (12) attached to a unidirectional clutch (14) to accommodate axial misalignment of a drive shaft attached to the body (16) of the joint (12) and a driven shaft grasped by the clutch (14). A housing (26) has a cylindrical top portion (28) with a top axial bore (30) for receiving a stem (18) of the joint (12) and a bottom axial bore (34) for receiving the clutch (14). A resilient sleeve (42) encloses the joint (12) and rests on a shoulder (40) on the housing (26). A collar (44) slides over the joint body (16) to bear against the top surface (43) of the sleeve (42) to place the sleeve (42) under a compressive load that urges the clutch housing (26) into axial alignment with the body (16) of the joint (12).

5 Claims, 1 Drawing Sheet

SELF-NORMALIZING COMPLIANT DRIVE COUPLING

TECHNICAL FIELD

The present invention relates to couplings for shafts and, more particularly, to a flexible coupling that engages and disengages a tool shaft as the flexible coupling is rotated by a drive shaft.

BACKGROUND OF THE INVENTION

Flexible couplings are employed to accommodate axial misalignment of two shafts connected to the coupling and are typically used in tapping and drilling operations to facilitate the proper positioning of the tap or drill tool with respect to the work surface. A flexible coupling allows a tool shaft to shift out of axial alignment with a drive shaft and shift into axial alignment with a preformed opening for reaming or tapping. In addition, a flexible coupling facilitates the drilling of new holes by enabling alignment of a drill to be normal to a work surface that is inclined with respect to a drive shaft.

Typical prior art flexible couplings utilize some form of universal joint to which the drive shaft and the tool shaft are attached. The universal joint permits rotation of the shafts when they are axially misaligned. In some cases, the joint is enclosed by a resilient body, such as rubber. The resilient body resists deflection of the joint and returns the misaligned shafts into axial alignment when the tool is not engaged with the work surface. While prior art flexible couplings have generally served their intended purpose, they have several disadvantages.

One disadvantage is the inability of the prior art couplings to repeatedly engage and disengage a series of tool shafts as the coupling and the drive shaft are rotating. This inability prevents a robotically positioned drive motor from automatically engaging and disengaging the various tool shafts as the drive motor is rotating. Instead, the drill motor must be stopped and the tools must be manually exchanged. In addition, prior art flexible couplings do not have the ability to automatically engage and disengage tool shafts of different size diameters, thus limiting the application of robotically controlled drive motors.

A further disadvantage of many prior art couplings is their inability to take a thrust load without compressing. In other words, couplings that utilize a resilient cushion or sleeve to connect the drive shaft and the tool shaft will compress when a thrust load is applied by the drive shaft. As a result of this compression, the depth of thrust of the tool shaft will be less than that of the drive shaft, thus limiting the application of robotically controlled drive motors have preprogrammed depth of thrust.

Another disadvantage is the inability to adjust the amount of resilient force exerted by the enclosing resilient body on the universal joint to compensate for resilient body wear and loss of resiliency or the attachment of a heavy tool to the universal joint. The inability to adjust the amount of resilient force results in the resilient body being unable to return the tool shaft and the drive shaft to axial alignment. As a result, the tool shaft will not be in alignment for the next operation, possibly causing damage or inaccurate machining. This drawback necessitates frequent replacement of the coupling, resulting in costly delays.

SUMMARY OF THE INVENTION

In accordance with the present invention, a self-normalizing compliant drive coupling for compensating for the axial misalignment of two connected shafts is provided. A body for receiving a drive shaft and a clutch for automatically engaging and disengaging a driven shaft are coupled together by a flexible joint. The flexible joint enables angular deviation of the body from axial alignment with the clutch and, thus, enable angular deviation between the driven and drive shafts. A resilient sleeve that houses the body and the joint urges the body and a clutch into axial alignment.

In accordance with another aspect of this invention, the flexible joint is preferably a constant-velocity joint. Ideally, the range of angular deviation of the joint is approximately 15° in any direction.

In accordance with still another aspect of this invention, the clutch is a unidirectional clutch that grasps the driven shaft when the clutch is rotated in one direction and releases the driven shaft when the clutch is rotated in an opposite direction.

In accordance with a further aspect of this invention, the resilient sleeve is placed under compression to vary the resilient force that acts to urge the body and the clutch into axial alignment. Preferably, the resilient sleeve is placed under compression by a collar that is slidably received on the body and bears against the resilient sleeve.

As will be readily appreciated from the foregoing description, a self-normalizing compliant drive coupling formed in accordance with the present invention has numerous advantages over previous couplings. The resilient sleeve can be placed under varying amounts of compression to alter the amount of resilient force that acts to urge the two shafts into axial alignment. This accommodates wear and a breakdown in the resiliency of the sleeve that occurs through use and facilitates the use of a variety of shaft weights. The constant-velocity joint avoids the fluctuation in the output velocity of the tool shaft that is common in nonconstant-velocity joints. The unidirectional clutch permits engagement and disengagement of the driven shaft as the coupling and the drive shaft are rotating. This permits rapid engagement and disengagement of a tap or drill tool by a robotically positioned drill motor. Thus, one drill motor can be rapidly moved on a gantry to a greater number of drilling or tapping stations than was previously possible.

A flexible drive coupling formed in accordance with the invention is usable in robotic applications where rotating tools contact the contoured surface and the tool is positioned without a template. A three-point contact foot is all that is required to position the tool normal to the work surface, thus eliminating a complex positioning program.

Furthermore, a drive coupling formed in accordance with the invention may be fastened to a hand-held drill motor when drilling through a bushing or liner. If a lateral force is applied to a drill motor when feeding the drill through the bushing, the drive coupling will allow the drill motor to move with the force and, thus, help prevent breaking off of the drill in the bushing. In addition to preventing drill breakage, the coupling will help reduce drill and bushing wear.

BRIEF DESCRIPTION OF THE DRAWINGS

The foregoing and other features and advantages of this invention will become better understand from the following detailed description of a preferred embodiment of the invention when considered in conjunction with the accompanying drawings wherein.

DESCRIPTION OF THE PREFERRED EMBODIMENT

Figure 1:
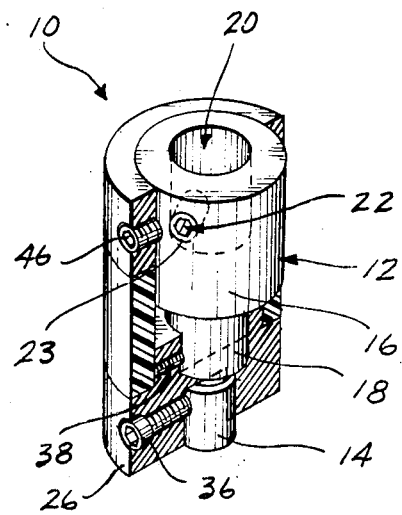
FIG. 1 is an isometric view in partial cross section of a selfnormalizing compliant drive coupling formed in accordance with the present invention; and, FIG. 2 is an exploded isometric view of the coupling shown in FIG. 1.
Figure 2:
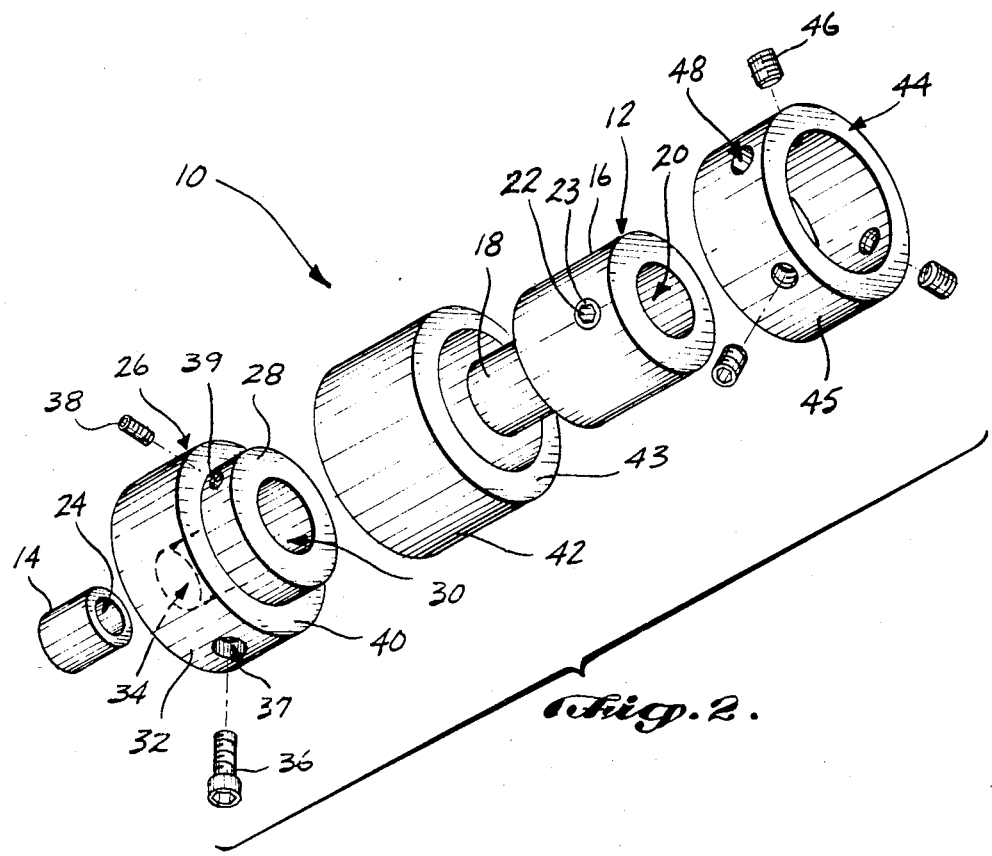

FIGS. 1 and 2 show a self-normalizing compliant drive coupling 10 formed in accordance with the present invention. As shown, the coupling 10 includes a constant-velocity joint 12 and a clutch 14. The joint 12 includes a cylindrical body 16 and a coaxial stem 18 located at one end of the body. A coaxial cylindrical bore 20 is located at the other end of the body 16. A threaded fastener, such as an allen screw 22, projecting through an opening 23 in the sidewall of the joint body 16 engages and holds a shaft (not shown) inserted into the cylindrical bore 20.

Since constant velocity joints are well known and commercially available, the construction of the constant velocity joint 12 is not described here. In general such joints are designed so that the rotational velocity of the stem 18 will be the same as the rotational velocity of the body 16 as the stem 18 deviates from axial alignment with the body 16 when one element, e.g., the body, is connected to a drive shaft and the other element, e.g., the stem is connected to a driven shaft. Because the velocity fluctuations are avoided, constant velocity joints can operate more smoothly and at higher speeds than non-constant velocity joints. Thus, constant velocity joints are ideally suited for high speed drilling and tapping operations where precision alignment is required. In one actual embodiment of the invention, the chosen constant velocity joint was a model FG-16, manufactured by General Thermodynamics.

The clutch 14 is unidirectional. Because such clutches are also well known and commercially available, the construction of the clutch 14 is also not described in detail here. Briefly, a unidirectional clutch is one which permits transmission of motion in one direction only. A mechanism within the clutch is designed to engage the clutch when the clutch is rotated in one direction and to disengage the clutch when the clutch is stopped or rotated in an opposite direction. The clutch 14 of the present invention has a cylindrical bore or opening 24 therethrough for receiving the shaft of a driven tool (not shown). The tool shaft is retained in engagement with the clutch 14 by means of the action of the clutch mechanism, which moves radially inward to reduce the inside diameter of the clutch bore 24 and grasp the tool shaft as the clutch 14 is rotated in one direction. Upon rotation of the clutch 14 in the opposite direction, the clutch mechanism moves radially outward to thereby increase the diameter of the bore 24 of the clutch 14 and release the tool shaft. As shown, the clutch 14 is retained without a housing 26. In one actual embodiment of the invention the chosen clutch was the model RC-04708 produced by Torrington.

The housing 26 has a cylindrical top portion 28 with a top axial bore 30 formed partially therethrough. The top axial bore 30 is sized and shaped to receive the cylindrical output stem 18 of the joint 12. The housing 26 also has a cylindrical bottom portion 32 with a bottom axial bore 34 formed partially therethrough that is sized and shaped to receive the clutch 14. A suitable fastener, such as a cap screw fastener 36, threaded through an opening 37 in the sidewall of the lower portion 32, retains the clutch 14 within the bottom axial bore 34. Likewise, a fastener, such as an allen screw 38, threaded throughan opening 39 in the sidewall of the cylindrical top portion 28, retains the stem 18 within the top axial bore 30.

Preferably, the cylindrical top portion 28 of the housing 26 has an outside diameter smaller than the outside diameter of the cylindrical bottom portion 32 such that a shoulder 40 is formed on the cylindrical bottom portion 32. A resilient sleeve 42 rests on the shoulder 40 and encloses the joint 12. Ideally, the outside diameter of the cylindrical top portion 28 matches the outside diameter of the cylindrical body 16 of the constant velocity joint 12. In any event, the resilient sleeve is sized such that the inside surface of the resilient sleeve 42 snugly engages the outside surfaces of both the cylindrical top portion 28 and the cylindrical body 16.

A collar 44 having an inside diameter substantially the same as the outside diameter of the cylindrical body 16 of the constant velocity joint 12 slidably engages the cylindrical input body 16 and bears against the adjacent (top) surface 43 of resilient sleeve 42. A plurality of fasteners, such as allen screws 46, threaded through the sidewall 45 of the collar 44 and bearing against the cylindrical body 16, retain the collar 44 in engagement with the constant velocity joint 12. An opening 48, formed in the sidewall 45 of the collar 44, gives access to the fastener 22 in the wall of the cylindrical input body 16. By this means the drive coupling 10 may be attached to or removed from a drive shaft without requiring removal of the collar 44.

The drive coupling 10 is assembled by first inserting the stem 18 of the constant velocity joint 12 into the top axial bore 30 in the cylindrical top portion 28 of the housing 26 and tightening the allen screw fastener 38. In a similar manner, the clutch 14 is inserted into the bottom axial bore 34 of the cylindrical lower portion 32 and the cap screw fastener 36 is tightened. Next, the resilient sleeve 42 is slid over the joint 12 to rest on the shoulder 40 of the housing 26. Finally, the collar 44 is slid over the cylindrical input body 16 to bear against the top surface 43 of resilient sleeve 42. Downward pressure is then applied to the collar 44 to preload the resilient surface 42 to a predetermined compressive load. After the opening 48 in the collar 44 is in alignment with the fastener 22, the allen screw fasteners 46 in the collar 44 are tightened to retain the collar 44 in engagement with the joint 12 and to maintain the resilient sleeve 42 under the predetermined compressive load.

In use, a drive shaft is inserted into the bore 20 of the constant velocity joint 12 and the allen screw fastener 22 is tightened down to secure the coupling 10 to the drive shaft. A driven shaft, such as a tool shaft, is inserted into the bore of the clutch 14. Upon rotation of the drive shaft, the constant velocity joint 12 permits axial misalignment of the tool shaft and the drive shaft up to a preferred maximum range of angular deviation—15°, for example. Upon reversing the rotation of the coupling 10, the clutch 14 releases the driven shaft and the preloaded resilient sleeve 42 urges the clutch 14 back into axial alignment with the joint 12. Resilient force adjustment to compensate for heavy tools and/or wear of the resilient sleeve 42 is provided for by adjustment of the pressure applied to the resilient sleeve by the collar 44.

As will be appreciated from the foregoing description, the present invention provides a drive coupling that will compensate for the axial misalignment of a drive shaft and a tool shaft. The slidable collar permits adjustment in the amount of resilient force exerted by the sleeve in urging the two shafts into axial alignment. In addition, while the constant velocity joint achieves precision in the output velocity of the tool shaft, the use of noncompressible coupling elements along the thrust line avoids compression of the coupling under thrust conditions and permits precision programming of the thrust depth of the tool. Furthermore, the unidirectional clutch permits clutch permits engagement and disengagement of the tool shaft as the coupling and the drive shaft are rotating, allowing a robotically positioned drill motor to rapidly move on a gantry to a large number of tool stations.

While the invention has been illustratively described in its preferred form, it is not intended to limit the scope of the claims that follow to the specifics of that design form, inasmuch as variations equivalent thereto are feasible without departing from the novel inventive concepts involved. These and other variations are contemplated to fall within the scope of the claims that follow.

The embodiments of the invention in which an exclusive property or privilege is claimed are defined as follows:

1. A self-normalizing compliant drive coupling for engagement and disengaging misaligned tool shafts, comprising:
    (a) a first receiving means for receiving a drive shaft;
    (b) a second receiving means for receiving a misaligned driven shaft, said second receiving means including a unidirectional clutch means for automatically engaging the driven shaft when the clutch means is rotated in one direction and disengaging the driven shaft when rotation of the clutch means is stopped;
    (c) a flexible joint coupling said first and second receiving means together, said flexible joint allowing the axis of the driven shaft received by said second receiving means to angularly deviate from alignment with the axis of the drive shaft received by said first receiving means, said flexible joint further comprising means for providing a constant velocity joint; and
    (d) a resilient sleeve housing said flexible joint, said resilient sleeve urging said first receiving means and said second receiving means and, thus, the drive and driven shafts received by said first and second receiving means into axial alignment.

2. The drive coupling of claim 1, wherein the range of angular deviation of said second means from axial alignment with said first means is approximately 15° in any direction.

3. The drive coupling of claim 1 further comprising means for placing said resilient sleeve under compression.

4. The drive coupling of claim 3, wherein said means for placing said resilient sleeve under compression comprises a shoulder on one of said first and second receiving means and a collar slidably received and adjustably positioned on the other of said first and second receiving means for bearing against said resilient sleeve to place said resilient sleeve under a selected compressive load.

5. The drive coupling of claim 4, wherein the range of angular deviation of said second means from axial alignment with said first means is approximately 15° in any direction.

* * * * *